UNITED STATES PATENT OFFICE.

CHARLES LLOYD HATCHETT AND ERNEST GEORGE RHODES, OF LONDON, ENGLAND.

MACHINE FOR GUMMING AND APPLYING LABELS TO BOTTLES, CANS, AND SIMILAR OBJECTS.

1,141,053.   Specification of Letters Patent.   Patented May 25, 1915.

Application filed December 19, 1913. Serial No. 807,662.

*To all whom it may concern:*

Be it known that we, CHARLES LLOYD HATCHETT and ERNEST GEORGE RHODES, citizens of London, England, residing at 62 Lordship Park, Stoke Newington, London, N., and 131 Wool Exchange, Coleman street, London, E. C., England, respectively, have invented an Improved Machine for Gumming and Applying Labels to Bottles, Cans, and Similar Objects.

In the accompanying drawings.

In the several figures like parts are indicated by similar letters of reference and Figs. 9 to 12, and 16 to 21 and 25 to 27 are drawn to an increased scale and Figs. 13, 22 to 24, 29 and 30 are drawn to a further increased scale with respect to the other figures of the drawings.

Figure 1:
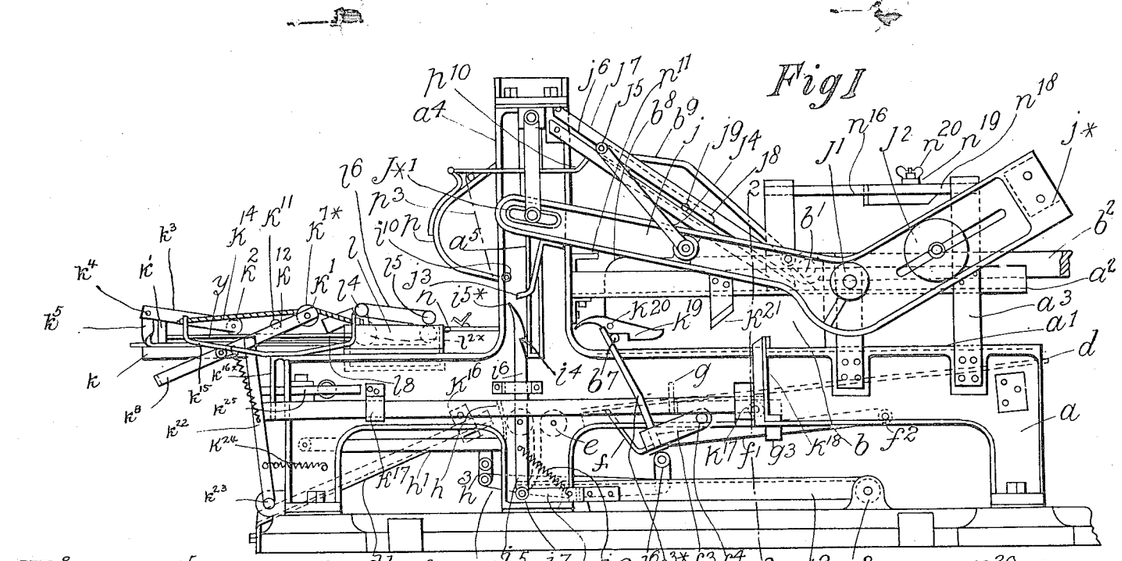
—Figure 1 is a side elevation of a machine constructed according to the present invention showing a label about to be gripped preparatory to carrying it into position to be wrapped around a can.
Figure 2:
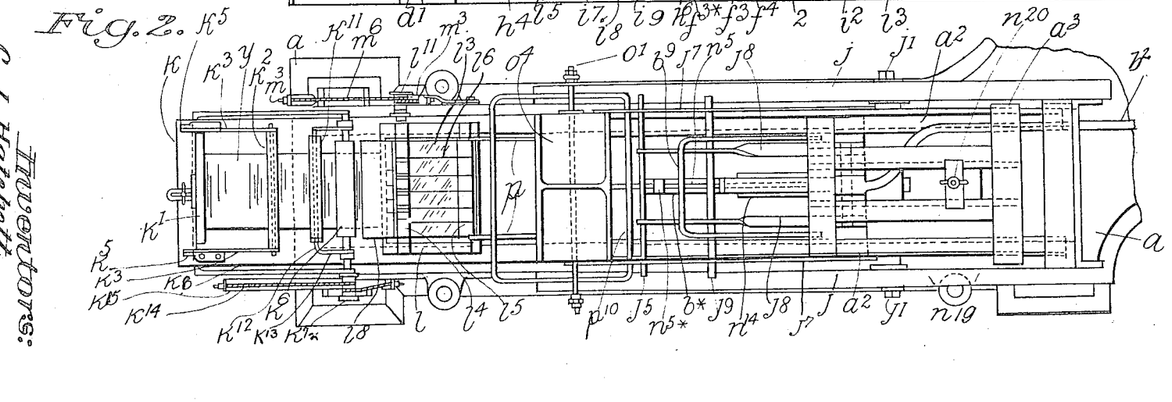
Fig. 2 is a plan thereof.
Figures 3, 4:
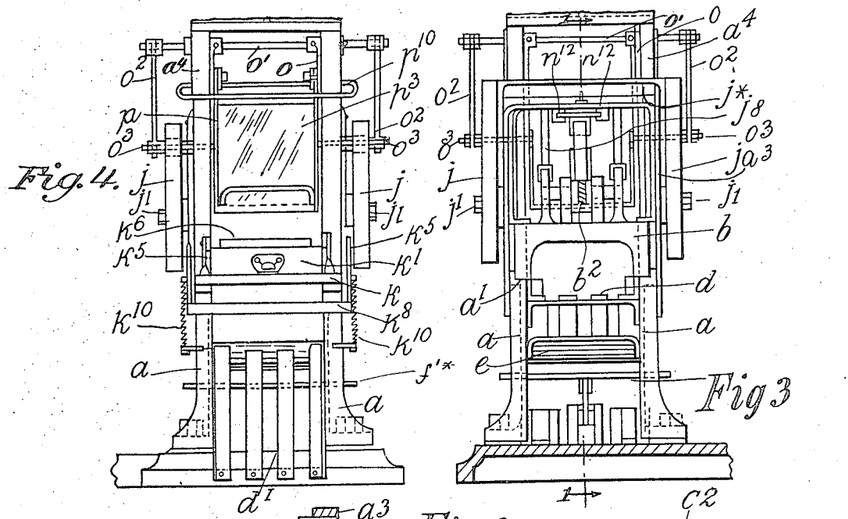
Fig. 3 is an end elevation of the machine looking toward the can feed end thereof.
Fig. 4 is a similar view looking toward the label feed end thereof.
Figure 6:
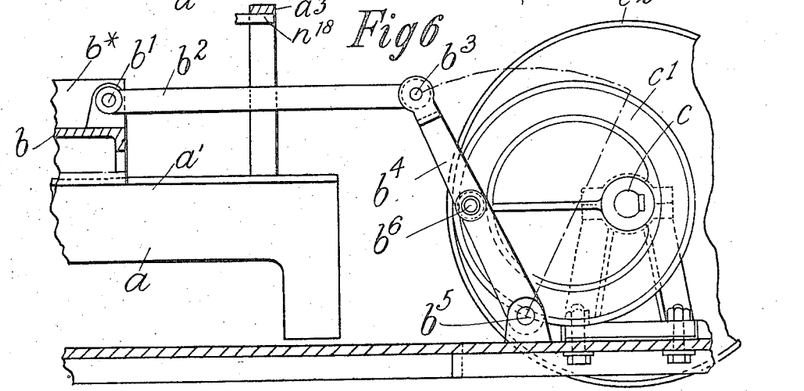
Fig. 6 represents part of Fig. 1 illustrating more particularly the driving mechanism.

Referring particularly to Figs. 1 and 6 $a$ represents the frame of the machine at the upper part of which are provided horizontal guides $a'$ disposed longitudinally of the machine, upon which guides is mounted a slide $b$ and over the top edge of the slide are provided longitudinal angle iron guides $a^2$ which are supported at one end by brackets $a^3$ bolted to the frame $a$ of the machine and at the other end by standards or pillars $a^4$ also formed with the frame $a$ of the machine.

Figure 7:
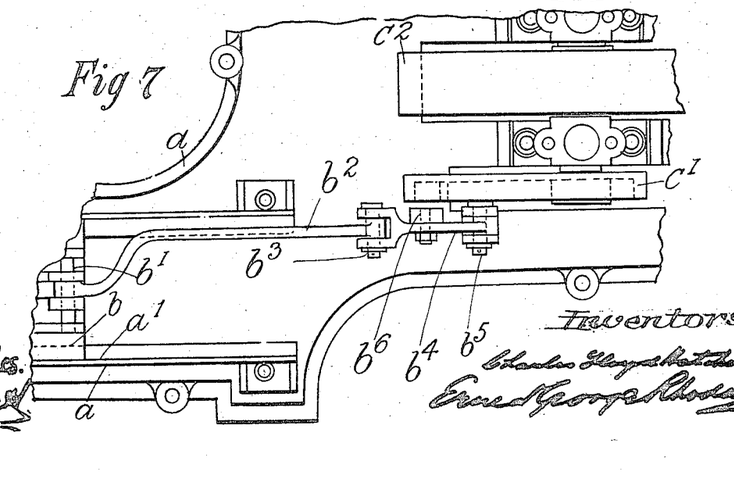
Fig. 7 is a plan thereof.

The slide $b$ see Fig. 7 has pivotally connected to its rear end at $b'$ one end of a link $b^2$, the other end of which is pivotally connected at $b^3$ to the upper end of a rocking arm $b^4$ which by its lower end is mounted upon a center of motion $b^5$ carried by lugs on the base frame $a$.

As shown in Fig. 6, the rocking arm $b^4$ is provided with a stud $b^6$ carrying a truck or roller which runs in the groove of an eccentric or cam $c'$ fixed upon the main shaft $c$ of the machine and which latter may be continuously driven by a band wheel or pulley $c^2$ fixed upon the shaft $c$, or by other suitable means, and the slide $b$ is thus continuously reciprocated over a given path with a dwell at each end of its traverse and all the motions of the machine are either directly or indirectly taken from the reciprocating slide $b$.

Figure 8:
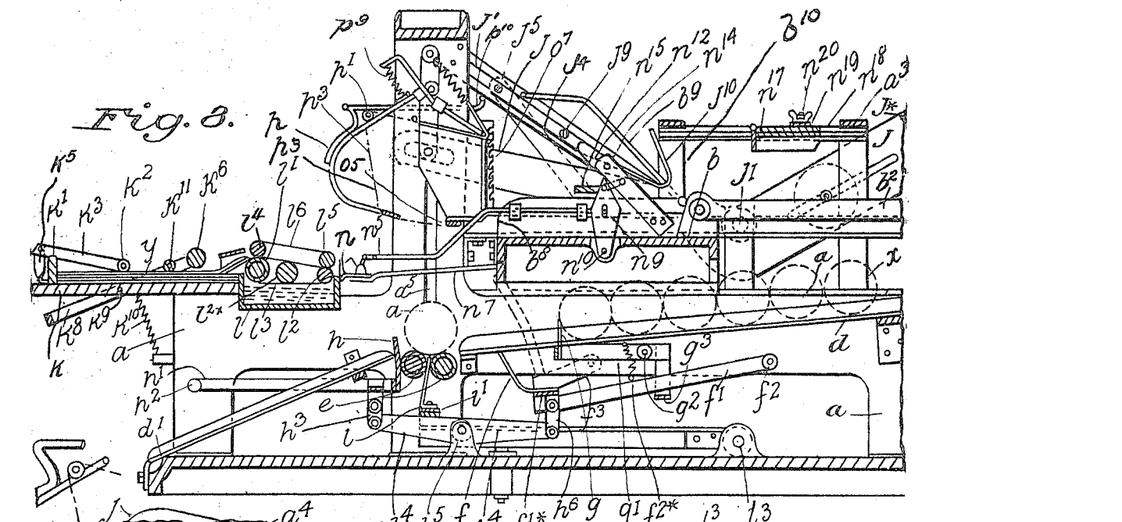
Fig. 8 is a vertical longitudinal section taken on the line 1—1 of Fig. 3.
Figure 9:
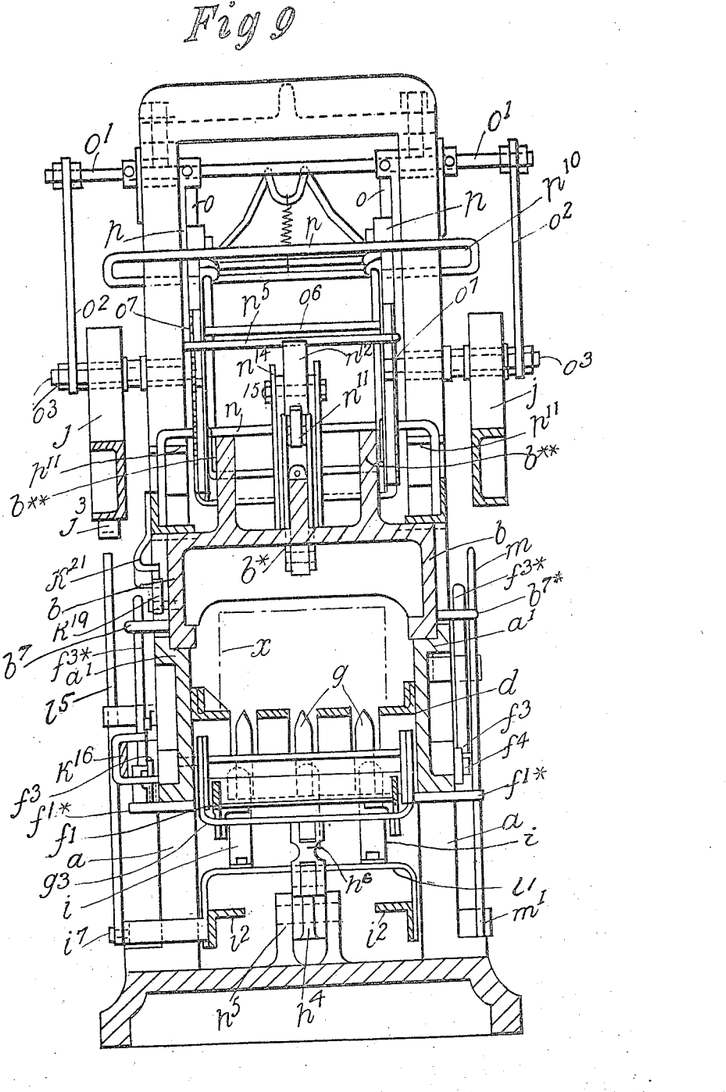
Fig. 9 is a vertical transverse section taken on the line 2—2 of Fig. 1 with some parts omitted for the sake of clearness.

$d$ represents an inclined table, platform or way commencing at the feed end of the machine upon which the cans $x$ or the like are stored side by side in a row in a horizontal position as shown at Fig. 8 and they run down this inclined platform or way $d$ by gravity to the operating table which may consist of rollers $e$, as shown, and to the wrapping device hereinafter described.

As the wrapping is effected on one can $x$ or the like another is placed by hand upon the inclined platform or way $d$ at the feed end of the machine so that assuming the slide $b$ is constantly reciprocated the work of the machine is continuous.

At the lower end of the inclined platform or way $d$ is a pair of rollers $e$ the axes of which are mounted in bearings in the frame $a$ of the machine so that they are free to revolve, and upon these rollers $e$, which constitute the operating table, the can $x$ or the like is adapted to rest while the wrapping is effected, the incline of the platform or way $d$ causing the can $x$ or the like to roll on to the rollers or operating table $e$ by their own motion.

In order to hold back the row of cans or the like $x$ upon the inclined platform or way $d$ and release one at a time so that it takes its place upon the operating table or rollers $e$ two sets of vertical stop fingers $f$ $g$ are provided, one set $f$ nearest the operating table or rollers $e$ being carried by a rectangular frame $f'$ pivotally mounted at the point $f^2$ upon the frame $a$ of the machine toward the feed end thereof.

Figure 10:
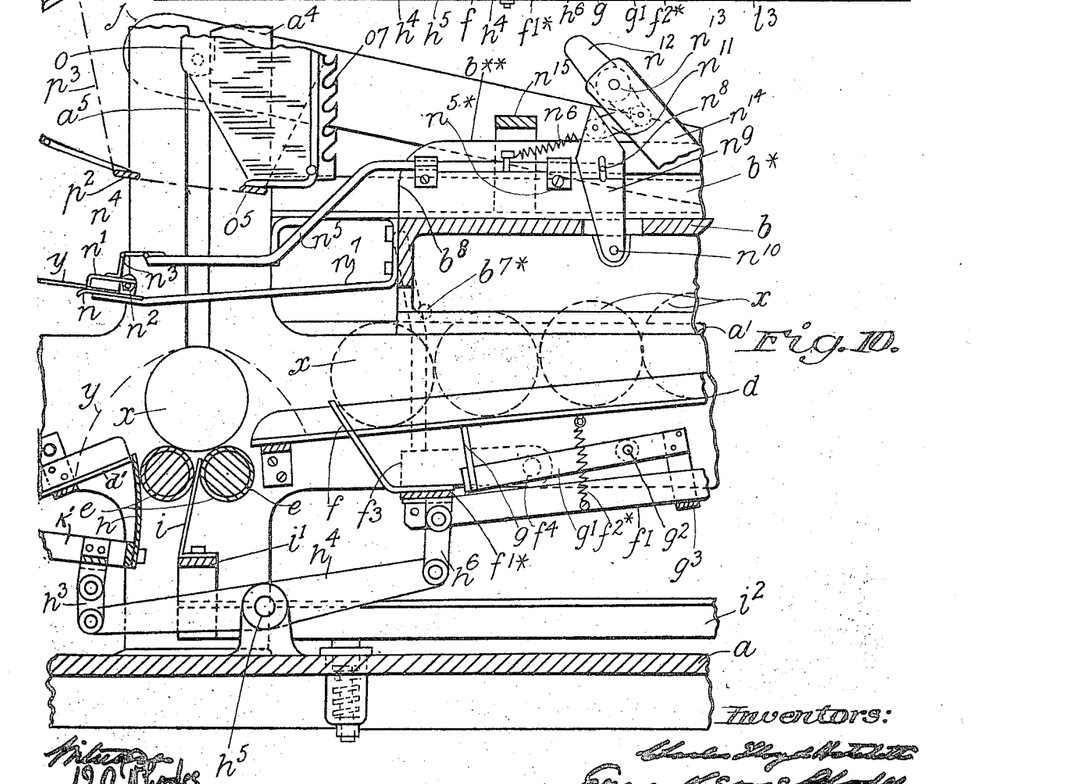
Fig. 10 represents part of Fig. 8 but showing the slide commencing its return movement and a label in the jaws of the gripper.

The frame $f'$ is acted upon by a spring $f^{2*}$ with a tendency to constantly raise it and the other set of fingers $g$ are carried by a rectangular frame $g'$ pivotally mounted at $g^2$ on the frame $a$ of the machine, see Fig. 8 and beyond this axis $g^2$ the second frame $g'$ is provided with a cross bar $g^3$, which bar is acted upon (when the first finger frame $f'$ is depressed so as to retract its stop fingers $f$) by the frame $f'$ carrying the first set of stop fingers $f$ and said frame $g'$ is thereby raised so as to raise the second set of fingers $g$. Thus the first set of fingers $f$ hold the row of cans $x$ or the like in check against movement as shown at Fig. 10 and on the depression of the first set of fingers $f$ to release the first can $x$ or the like of the row in order to allow it to run on to the operating table or rollers $e$, the second set of fingers $g$ is raised behind the first can $x$, as shown at Fig. 8, and checks the next of the row of cans $x$ and therefore the remainder of the row.

Beyond the operating table or rollers $e$ is a stop $h$ which is carried by a rectangular frame $h'$ pivotally mounted at $h^2$ upon the frame $a$ of the machine and this frame $h'$ is connected by a link $h^3$ with one end of a balanced lever $h^4$ mounted upon an axis of motion $h^5$ carried by the base of the frame $a$ of the machine and the other end of this lever $h^4$ is connected by a link $h^6$ with the first finger frame $f'$. Thus the depression of the first set of fingers $f$ also raises the stop $h$ which arrests the can $x$ or the like so that it takes up a proper position on the rollers or operating table $e$ as shown at Fig. 8 but this stop $h$ is lowered by the movement of the frame $f'$ during the application of the label or wrapper $y$ to the can $x$ or the like.

The first finger frame $f$ Fig. 1 is depressed at the times desired by cranked levers $f^3$ pivoted at $f^4$ which act upon the ends of a cross-bar $f'^*$ fixed to the first finger frame $f$ and these levers $f^3$ are provided with vertical arms $f^{3*}$ which are acted upon by pins $b^7$ $b^{7*}$ projecting laterally from the slide $b$ and the levers $f^3$ thus act to depress the first finger frame $f$ and its fingers $f$ and to raise the second finger frame $g'$ and its fingers $g$ and also through the balanced lever $h^4$ to raise the stop $h$ beyond the operating table or rollers $e$.

Immediately before the application to the can $x$ or the like upon the operating table or rollers $e$ of a label or wrapper $y$ as hereinafter described the stop $h$ is lowered by reason of the return traverse of the slide $b$ causing the pins $b^7$ $b^{7*}$ to recede from the vertical arms $f^{3*}$ of the levers $f^3$ and consequently the first set of figures $f$ are raised by the influence of the spring $f^{2*}$ and the second set of fingers $g$ are lowered by the movement of the frame $f'$ so that another can $x$ or the like rolls down the inclined table or way $d$ up against the first set of fingers $f$ ready to be released as hereinbefore described.

Figure 14:
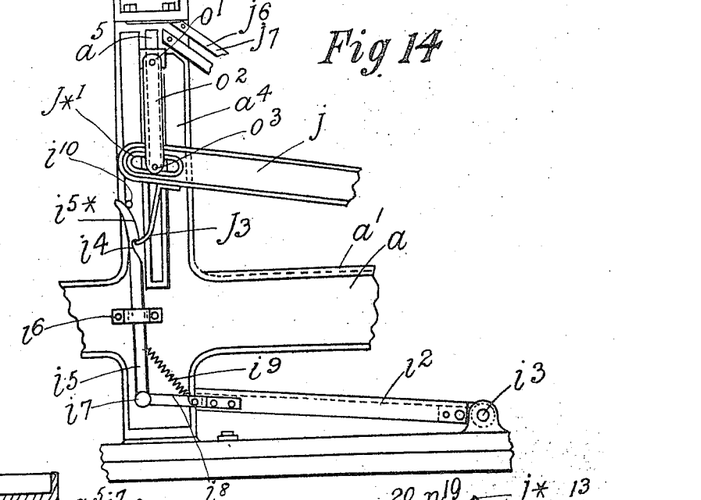
Fig. 14 is a side elevation of parts showing more particularly the means for giving an impulse to the can on its discharge from the operating table.

The labeling having been completed on the operating table or rollers $e$ as hereinafter described a set of curved projections or fingers $i$ supported by a cross bar $i'$ carried by a frame or arms $i^2$ pivotally mounted at $i^3$ come up under the labeled can $x$ and give it an impulse to cause it to run off the operating table or rollers $e$ on to the inclined plane $d'$ which delivers it from the machine. These impulse giving projections or fingers $i$ are raised at the required times by the following means:—On the outside of the frame $a$ of the machine are pivotally mounted at $j'$ two levers $j$ see Fig. 14 and these levers $j$ are connected at the feed end of the machine by means of a cross bar $j^*$ and beyond their axes $j'$ the levers $j$ are provided with adjustable counter-weights $j^2$ and one of these levers is furnished with a downward projection $j^3$ which engages a notch $i^4$ in a vertical bar $i^5$ loosely working in a guide $i^6$ carried by the frame $a$ and the lower end of which bar $i^5$ is pivotally connected at $i^7$ to a cranked offset $i^8$ from one of the side bars or arms $i^2$ of the frame carrying the impulse giving projections or fingers $i$. This vertical bar $i^5$ is held toward the projection $j^3$ of the counter-weighted levers $j$ by means of a spring $i^9$ while the nose of said bar $i^5$ above the incline $i^4$ is formed with an incline $i^{5*}$ which in its rise engages a pin $i^{10}$ upon the frame $a$ of the machine by which it is disengaged from the projection $j^3$ of the counter weighted levers $j$ thus allowing said impulse giving projections $i$ to fall by gravity and retire after having done their work.

Figure 5:
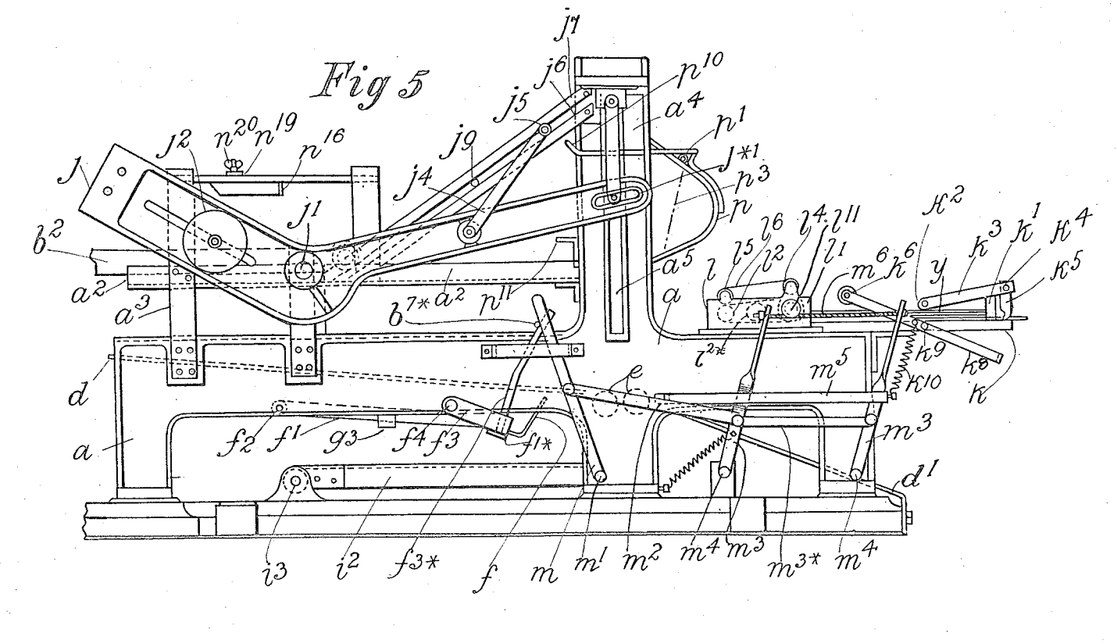
Fig. 5 is a similar view to Fig. 1 but taken from the opposite side of the machine and with some parts omitted for the sake of clearness.

In order to raise the counter-weighted levers $j$ at the times required they are connected as shown in Figs. 1 and 5 by links $j^4$ to a cross bar $j^5$ working in inclined guide slots $j^6$ formed in bars $j^7$ and this cross bar $j^5$ and a corresponding bar $j^9$ have fixed thereto two longitudinal bars $j^8$ which are supported or guided by the second cross bars $j^5$ and $j^9$ also working in the inclined slots $j^6$.

Figure 15:
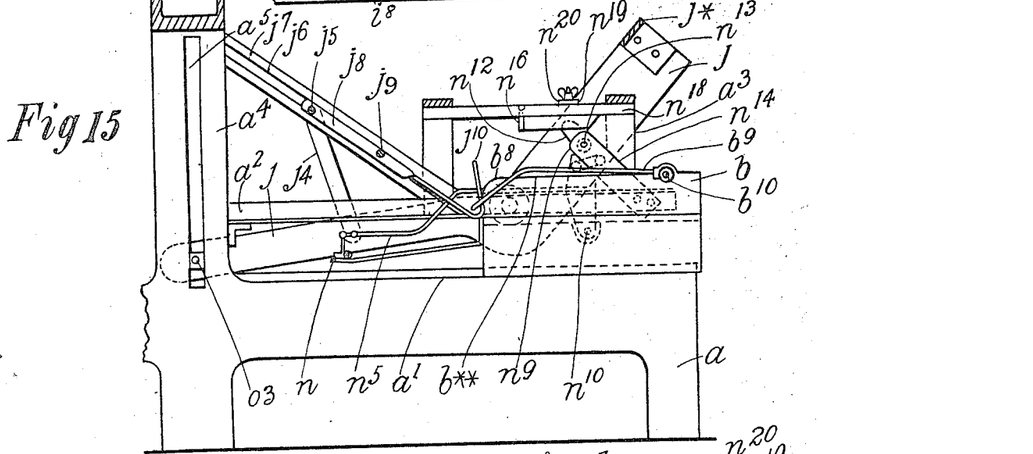
Fig. 15 is a side elevation of parts showing more particularly the means for operating the gripping device.

The longitudinal bars $j^8$ at their lower extremities are formed with cranked or hook like ends $j^{10}$ which during the inward traverse of the slide $b$ are acted upon by the flat parts or ends of the noses $b^8$ of the slide $b$ which cause the cross-bars $j^5$ $j^9$ to travel up the inclined guides $j^6$ as shown in Fig. 15 and thus raise the ends of the counter-weighted levers $j$ after which the hook like ends $j^{10}$ of the longitudinal bars $j^8$ ride up upon the rounded parts of the noses $b^8$ of the slide $b$ and travel along plain parts $b^{**}$ of said slide leaving the counterweighted levers $j$ thus raised for the time being.

The counterweighted levers $j$ are restored to their normal position in the return motion of the slide $b$ by a bail like link $b^9$ pivotally mounted by its ends at $b^{10}$ upon the slide $b$ and which loosely engages the hook like rounded ends $j^{10}$ of the longitudinal bars $j^8$ operating the counter-weighted levers $j$.

The means for feeding the labels, wrappers or the like $y$ to the operating table or rollers $e$ are as follows:—The labels or wrappers $y$ are piled upon a table $k$ at the delivery end of the machine Figs. 1, 8 and 19 and at their ends these labels are held in position by a plate or stop $k'$ which is made adjustable longitudinally of the table $k$ to accommodate different sized labels $y$, and resting upon the pile of labels $y$ is a heavy roller $k^2$ revolubly mounted in the extremities of arms $k^3$ pivotally and independently mounted upon axes $k^4$ carried by brackets $k^5$ rising from the table $k$. Resting upon the pile of labels $y$ near to the extremity thereof is a rubber covered roller $k^6$, hereinafter called the feed roller, and the shaft or axis $k^7$ of this roller is revolubly mounted in the extremities of arms $k^8$ mounted upon axes of motion $k^9$ carried by the table $k$ and it is held in contact with the labels $y$ by springs $k^{10}$ and further within the length of labels $y$ and resting upon the pile is a smaller but idle roller $k^{11}$ revolubly mounted upon axes $k^{12}$ carried by arms $k^{13}$ loosely mounted upon the shaft $k^7$ of the feed roller $k^6$ Figs. 19 and 20 so that said roller $k^{11}$ rests upon the pile of labels $y$. Beyond the feed roller $k^6$ is a bath or tank $l$ containing a suitable cement and within this bath or tank are two rollers $l'$ $l^2$ the latter of which rollers is an idle roller and around these rollers $l'$ $l^2$ is passed an endless band or belt $l^3$ of any suitable fabric the lower convolution of which has a loose heavy roller $l^{2*}$ resting on it so that it is depressed thereby and passes through the cement in the bath or tank $l$ and thus becomes saturated. Above the cementing belt $l^3$ are other rollers $l^4$ $l^5$ around which pass endless webs $l^6$ and the first of these rollers $l^4$ is between the webs $l^6$ covered with rubber in order to enable it to obtain a grip of the label $y$. The roller $l'$ is preferably roughened in order to give a positive traverse to the cementing band $l^3$ see Fig. 8 and the roller $l^4$ is driven by frictional contact with the roller $l'$ and thus motion is imparted to the belt 13. Pivotally mounted on axes $l^7$ in front of the first web roller, that is the rubber covered one $l^4$, is a V-shaped tubular guide $l^8$ co-extensive with the roller $l^4$ and the lower edge of this guide is provided with needle points $l^9$ which rest upon the pile of labels $y$ or the like on the table $k$ while the upper edge of the guide $l^8$ adjacent to the rollers $l'$ $l^4$ is provided with similar but cranked needle points $l^{10}$ which act to guide the labels $y$, as hereinafter described and shown more particularly at Fig. 22, between the rollers $l'$ $l^4$ and between the cementing belt or band $l^3$ and webs $l^6$. The endless cementing band $l^3$ is traversed at the required times by means of the pin or projection $b^{7*}$ on the slide $b$ which acts against a lever $m$ pivotally mounted at $m'$ on the frame $a$ and which lever by a link $m^2$ is connected with one of a pair of arms $m^3$ connected by a link $m^{3*}$ which arms $m^3$ are pivotally mounted on the frame $a$ at $m^4$. The arms $m^3$ work within a guide rail $m^5$ carried by the frame $a$ and to the upper extremities of said arms $m^3$ are fixed the ends of a length of cord $m^6$ or the like which is passed several times around and fixed to a drum $l^{11}$ loosely mounted upon the shaft $l'^*$ of the roller $l'$ supporting the cementing belt $l^3$ and this drum $l^{11}$ through a pawl $l^{12}$ mounted on the drum $l^{11}$ and a ratchet wheel $l^{13}$ fixed upon the shaft $l'^*$ drives the roller $l'$ and traverses the cementing belt or band $l^3$ in one direction this mechanism being shown more particularly at Fig. 23.

Figures 19, 22, 23:
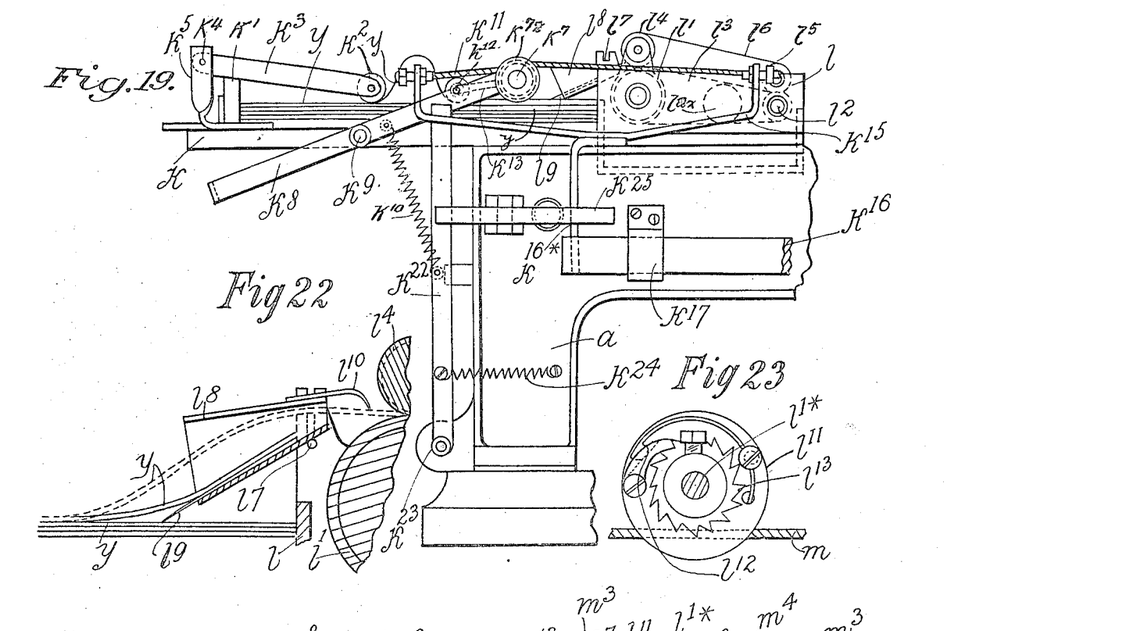
Fig. 19 is a side elevation of the label feeding and gumming or cementing end of the machine.
Fig. 22 is a detail view of the guide for conducting the label to the feed roller.
Fig. 23 is a detail view of the drum and ratchet device for giving motion to the cement or gum band.
Figure 20:
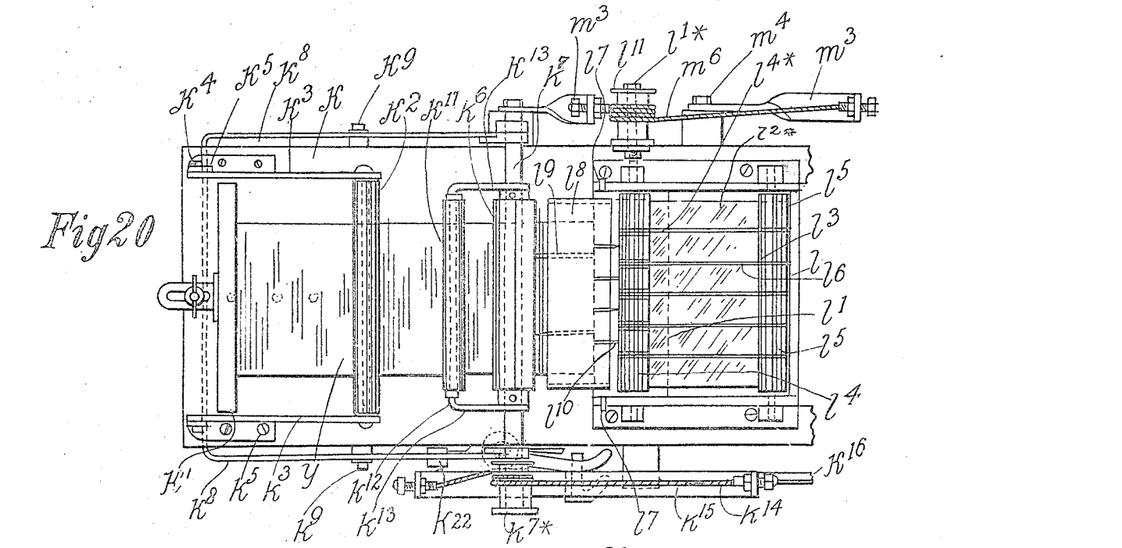
Fig. 20 is a plan thereof.
Figure 21:
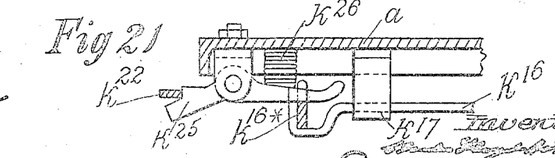
Fig. 21 is a similar view to Fig. 18 but showing the detent tripped.

Upon the shaft $k^7$ of the feed roller $k^6$ is fixed a drum $k^{7*}$, see Figs. 19, 20, and 21, and around this drum is passed several times and fixed midway of its length a cord $k^{14}$ or the like, similar to that described with respect to the drum $l^{11}$, and the ends of this cord $k^{14}$ are fastened to the arms of a fork $k^{15}$ carried by a sliding bar or rod $k^{16}$ mounted with capability of longitudinal movement in guides $k^{17}$ carried by the frame $a$ of the machine. This sliding bar $k^{16}$ is provided with an upwardly projecting offset $k^{18}$ which is acted upon during the inward or forward motion of the slide $b$, to rotate the feed roller $k^6$ in one direction, by a catch $k^{19}$ pivotally mounted at $k^{20}$ upon said slide $b$ while the offset $k^{18}$ from the sliding bar $k^{16}$ is acted upon or traversed in the other direction, that is, in the outward traverse of the slide $b$ by the lateral pins or projections $b^7$ carried by the slide $b$.

Inasmuch as the feed roller $k^6$ is only required to be rotated a limited number of times the pivotal catch $k^{19}$ at a given point of the inward traverse of the slide $b$ is tripped by an incline $k^{21}$ carried by the frame $a$ so as to free it, that is the pivotal catch $k^{19}$ from the offset $k^{18}$ on the sliding bar $k^{16}$ while in the return traverse the pivotal catch $k^{19}$ rides over the offset $k^{18}$, for which purpose it is inclined. Therefore the motion of the slide $b$ in one direction, that is in its inward traverse, rotates the feed roller $k^6$ in one direction and the return or outward motion of the slide $b$ rotates the feed roller $k^6$ in the opposite direction through a given number of revolutions.

Figure 18:
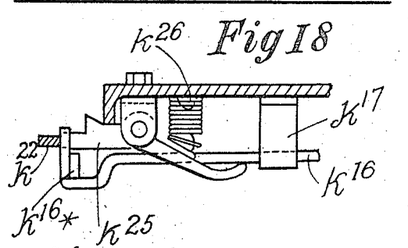
Fig. 18 is a detail view of the detent and parts coacting with the feed roller.

In the outward motion of the slide $b$ the feed roller $k^6$ is rotated in a direction toward the V shaped tubular guide $l^8$, the effect of which is to buckle the top label $y$ of the pile, as shown more particularly at Fig. 19, while in the reverse or inward motion of the slide $b$ the feed roller $k^6$ is lifted by an oscillating vertical bar $k^{22}$ pivotally mounted by its lower end at $k^{23}$ on the base of the frame $a$, said bar being pulled in one direction by a spring $k^{24}$ and acted upon in the other direction by the end of the sliding bar $k^{16}$. The upper end of the oscillating vertical bar $k^{22}$ is forked to engage one of the pivotal arms $k^8$ carrying the feed roller $k^6$ and which arms $k^8$ are arranged in an inclined position so that by traveling up the inclined arm the oscillating vertical bar $k^{22}$ lifts the feed roller $k^6$ off the pile of labels $y$, as shown more particularly at Fig. 8. The oscillating vertical bar $k^{22}$ is held with the feed roller $k^6$ in its raised position by means of a detent $k^{25}$ pivotally mounted upon the frame $a$ and held in its acting position by a spring $k^{26}$, as shown at Fig. 18, but this detent $k^{25}$ is tripped on the next movement, that is the reverse movement, of the sliding bar $k^{16}$, by means of a projection $k^{16*}$ from the sliding bar $k^{16}$ so as to allow the oscillating vertical bar $k^{22}$ to return to its normal position and thus permit the feed roller $k^6$ to resume its position upon the pile of labels $y$, as shown at Figs. 19 to 21.

While the feed roller $k^6$ is held raised the top label $y$ of the pile, which has been previously buckled as hereinbefore described, and therefore drawn from under the needle points $l^9$ resting on it, now straightens out by its natural spring, as shown at Fig. 22, and rides up the needle points $l^9$ into the V shaped tubular guide $l^8$ and the feed roller $k^6$ then carries it under the cranked needle points $l^{10}$ which help to guide it and into the grip of the rollers $l'$ $l^4$ as shown by the dotted lines in Fig. 22. The label is thence carried between the web $l^6$ and the top convolution of the cementing band or belt $l^3$ by which it is conveyed over or across the cement bath or tank $l$ and coated on its underside with cement. The end of the coated label as it issues from between the rollers $l^2$ $l^5$ is gripped between jaws $n$ $n'$ carried by arms $n^7$ projecting from the front of the slide $b$. The lower one $n$ of these jaws is fixed to the arms $n^7$ and the other $n'$ is movable, that is to say it is mounted upon an axis $n^2$ and an offset $n^3$ from the movable jaw $n'$ is connected through a link $n^4$ to a sliding rod $n^5$ which is acted upon by a spring $n^6$, as hereinafter described, to hold the jaws $n$ $n'$ normally closed, as shown more particularly at Fig. 10 which illustrates a label $y$ gripped between the jaws $n$ $n'$ and about to be released.

Figure 16:
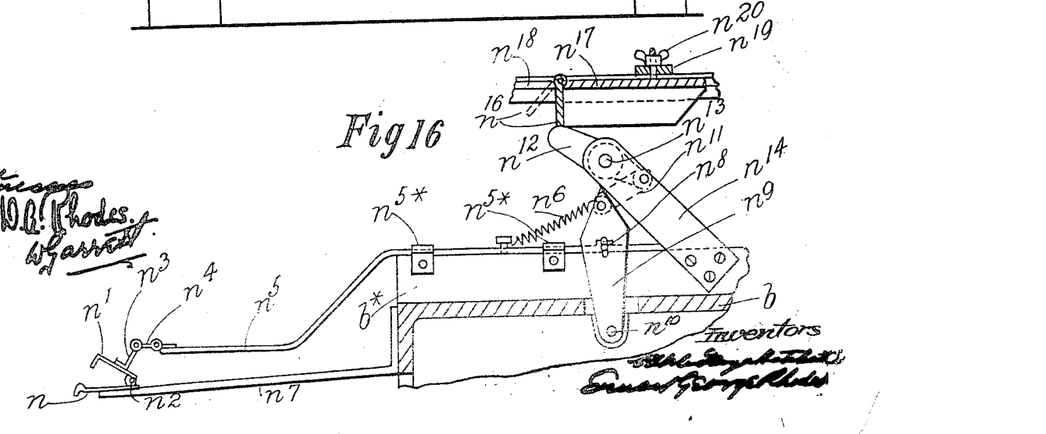
Fig. 16 is a sectional view similar to Fig. 8 showing more particularly the means for opening the gripping device in order to release the label in a position over the can on the operating table.
Figure 17:
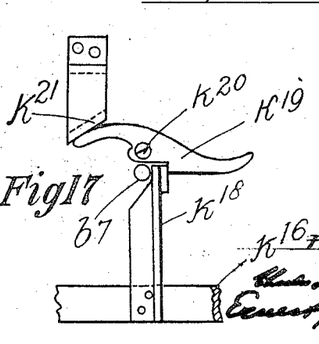
Fig. 17 is a detail view of parts connected with the slide for operating the label feed.

The sliding rod $n^5$ see Figs. 10 and 16 is mounted with capability of longitudinal movement in guides $n^{5*}$ carried by a central part $b^*$ of the slide $b$ and the rod $n^5$ is provided with a cross pin $n^8$ which works in slots formed in a lever $n^9$ so that the rod $n^5$ is pivotally connected therewith and said lever $n^9$ is mounted upon an axis of motion $n^{10}$ on the slide $b$ and the upper part of said lever $n^9$ is acted upon by the spring $n^6$ which consequently acts upon the rod $n^5$. The upper end of the lever $n^9$ is pivotally connected by a link $n^{11}$ with one end of another or latch lever $n^{12}$ pivoted at $n^{13}$ to the upper end of an inclined bar $n^{14}$ fixed to the slide $b$ and these parts are so arranged that in the inward traverse of the slide $b$ the nose of the lever $n^9$ comes against a bar or projection $n^{15}$ carried by the frame $a$ which through the sliding rod $n^5$ opens the jaws $n\ n'$ in order to receive a label $y$ from the cementing apparatus as shown more particularly at Fig. 8, and then on the commencement of the outward traverse of the slide $b$ allows the jaws $n\ n'$ to close, as shown at Fig. 10. On the completion of the outward traverse of the slide $b$ the latch lever $n^{12}$ comes against the hinged stop $n^{16}$ which causes the jaws $n\ n'$ to again open so as to allow the label $y$ to fall with its cement coated side downward on to the can $x$ or the like upon the operating table or rollers $e$.

The hinged stop or projection $n^{16}$ which engages the latch lever $n^{12}$ and opens the jaws $n\ n'$ on the outward traverse of the slide $b$ is made adjustable longitudinally of the machine by mounting said stop on a slide $n^{17}$ traveling in guide grooves in guide bars $n^{18}$ and it is adapted to be fixed in its adjusted position by means of a clamping bar $n^{19}$ and a fly nut $n^{20}$. By suitably adjusting the hinged stop $n^{16}$ the position at which the cement coated labels $y$ are released may be regulated according to their length.

In order to wrap the cement-coated labels $y$ around a can $x$ or the like, the following device is provided:—The standards $a^4$ rising from the base of the frame $a$ of the machine are provided with vertical guide slots $a^5$ in which works the top bar $o'$ of a vertically movable frame $o$, and the top bar $o'$ is extended beyond the standards $a^4$ on each side of the machine and by means of straps $o^2$ has attached to it inwardly projecting pins $o^3$ which also engage the vertical slots $a^5$ in the standards $a^4$ and these pins $o^3$ also engage slots $j^{*'}$ formed in the ends of the counterbalanced levers $j$, and thus, in the rising and falling movements of said levers $j$, the frame $o$ is also raised and lowered.

Figures 11, 12, 13:
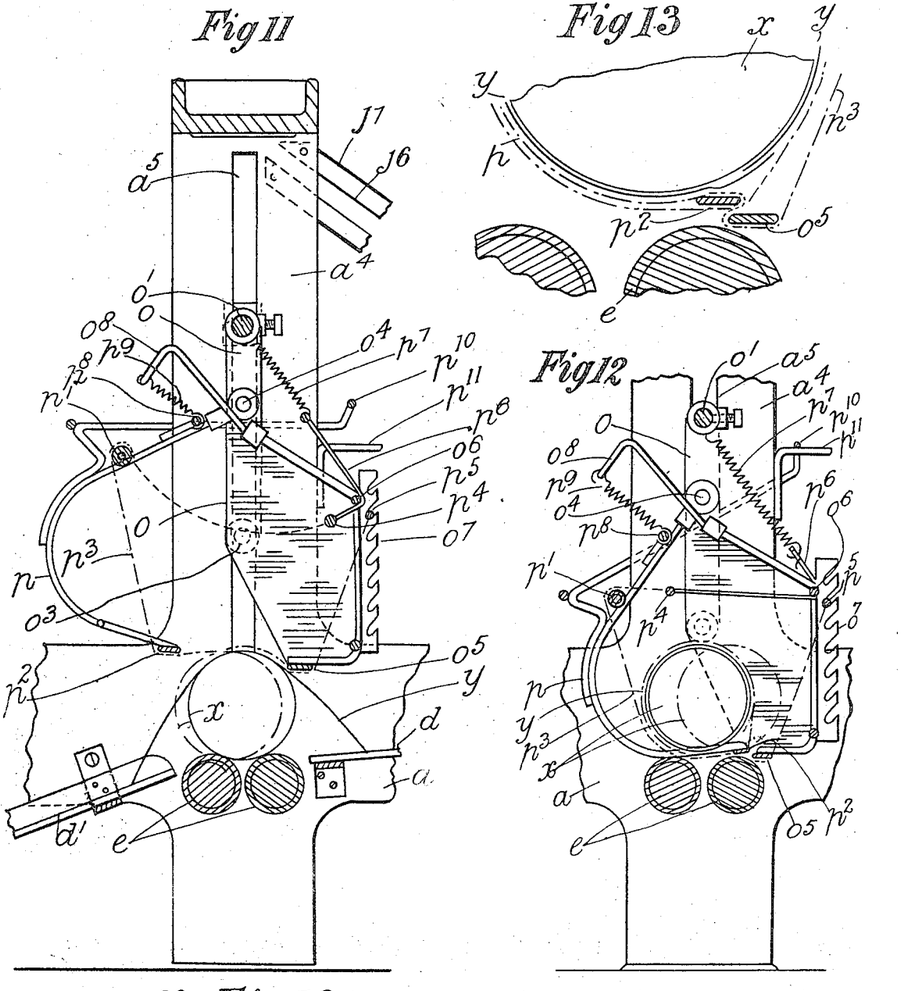
Fig. 11 represents a part of Fig. 8 but illustrating the commencement of the wrapping of the label around the can.
Fig. 12 is a similar view illustrating the last stage of the wrapping operation.
Fig. 13 represents part of Fig. 12.

Mounted on axes at $o^4$ on the vertically movable frame $o$ within the standards $a^4$ see Figs. 5 and 11 is a kind of cradle $p$ of semicircular shape which near to its upper part carries a transverse roller $p'$ and at its lower extremity this cradle is provided with a bar-like jaw $p^2$ faced with leather or the like and the vertically movable frame $o$ is provided with a corresponding jaw $o^5$ at its lower part. Passing over the roller $p'$ and under the jaw $p^2$ of the cradle $p$, thence over or across the operating table or rollers $e$ and thence under the jaw $o^5$ of the vertically movable frame $o$ is a canvas or other suitable band $p^3$ having bars $p^4\ p^5$ at the ends thereof. One bar, that is the bar $p^4$, has attached to it a cord or band $p^6$ which passes under a bar $o^6$ at the front of the vertically movable frame $o$, and is, through the intervention of a spring $p^7$, attached to the bar $o'$ on said frame $o$. The bar $p^5$ of the band $p^3$ is at its ends prolonged beyond said band and lodges in the notches of vertical racks $o^7$ carried by the vertically movable frame $o$ so that the acting length of the band $p^3$ may be regulated to suit different diameters of cans $x$ or the like. Or the bar $p^5$ which is supported by the rack $o^7$ may be centrally connected to a bar fastened to the end of the band $p^3$ by a cord or other flexible connection so as to leave greater play to the band $p^3$, in order to enable it to accommodate itself to objects of irregular shape.

The cradle $p$ see Fig. 11 has attached to a bar $p^8$ thereof one end of a spring $p^9$ the other end of which is attached to an arm $o^8$ projecting from the frame $o$ so that the spring $p^9$ tends to turn the cradle $p$ upon its pivots $o^4$ and thus take up the slack of the band $p^3$. The vertically movable frame $o$ is raised during the inward traverse of the slide $b$ by means of the counter-weighted arms or levers $j$ and the cradle $p$ has fixed thereto a bar $p^{10}$ which comes against the underside of the guide bars $j^7$, or it might be against some other fixed part of the machine, and thereby turns the cradle $p$ on its axes so as to take up the slack of or stretch the band $p^3$ ready for the wrapping action as shown more particularly at Fig. 8.

Toward the end of the outward traverse of the slide $b$ the vertically movable frame $o$ is lowered by the counter-weighted arms or levers $j$ so that the band $p^3$ rests upon the label $y$, the underside of which is coated with cement, and which has fallen on to the can $x$ or the like as previously explained, and in the continued downward movement of the vertically movable frame $o$ the bight of the band $p^3$ being arrested by the can $x$ on the operating table or rollers $e$ the fixed jaw $o^5$ of the frame $o$ carries one part of the band $p^3$ and therefore one end of the label $y$ downward and partly around the can $x$ or the like at the same time pushing the can $x$ into the position shown by dotted lines as illustrated at Fig. 11.

The movable jaw $p^2$ of the cradle $p$ swings partly under the can $x$ carrying the slack of the band $p^3$ see Fig. 12 and therefore the other end of the label $y$ with it and the bar $p^{10}$ of the cradle $p$ then comes against a stop $p^{11}$ on the standard $a^4$ which causes the movable jaw $p^2$ of the cradle $p$ to carry the band $p^3$ under and partly around the can $x$ until the jaws $p^2\ o^5$ slightly overlap, moving the can $x$ into the position indicated by dotted lines, at the same time lifting said can $x$ as shown at Fig. 12. Consequently the label $y$ is wrapped completely around the can $x$ and is caused to slightly overlap at its ends assuming that its length is sufficient for that purpose as shown at Fig. 13.

By reason of the holding of one or both ends of the band $p^3$ by its center it is possible to wrap labels or the like around bottles, cans, or other articles of various shapes, even conical ones, the band $p^3$ accommodating itself thereto.

In some cases the band $p^3$ may be longitudinally divided into two or more parts separately held in position.

Figure 24:
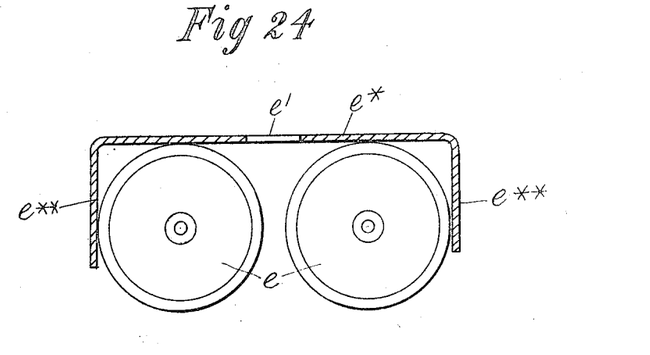
Fig. 24 is a detail view partly in section of the operating table showing applied thereto a removable table for flat sided objects.

In the example given at Fig. 24 the operating table of the machine is shown to have applied thereto a removable plate or table $e^*$ provided with flanges $e^{}$ adapted to saddle the rollers $e$ and be held in position by means of its flanges $e^{}$ and which plate or table $e^*$ is provided with perforations $e'$ designed to allow the passage therethrough of the impulse giving fingers $i$. This flat table or plate $e^*$ is designed to be used when operating upon flat-sided objects which would not roll down the inclined platform $d$ and in that case the inclination of the platform $d$ is so arranged that the articles will slide down the same by gravity onto the table $e^*$, and, if desired, said platform may be provided with rollers to facilitate the travel of the articles. Or the plate or table $e^*$ may be permanently fixed in position and substituted for the rollers $e$.

Figure 25:
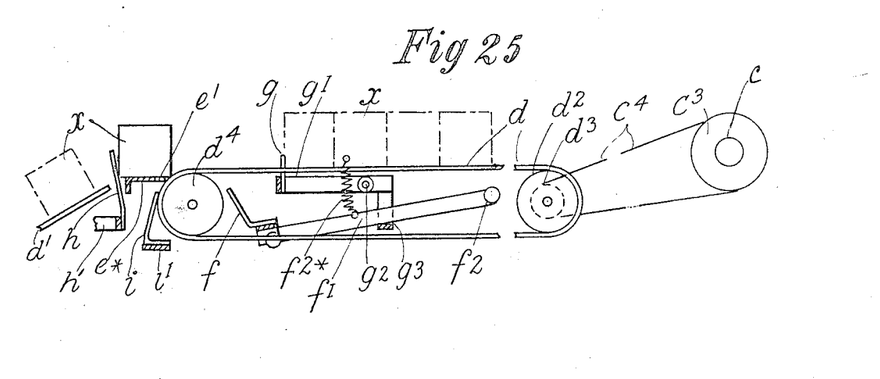
Fig. 25 is a diagrammatic view illustrating the employment of an endless band for conveying flat sided objects to a permanent operating table.

In Fig. 25 there is shown diagrammatically, an endless band $d$, stretched on rollers $d^2$, $d^4$, the same constituting a traveling platform which is driven from a pulley $c^3$ on the main shaft $c$, by means of a band $c^4$ which runs on pulley $d^3$ attached to roller $d^2$.

The operating table $e^*$ presents a flat surface, similar to that hereinbefore described, but in this case it is shown to be permanent and is preferably placed at a slightly lower level than the traveling platform $d$. On the inward movement of the articles $x$ being arrested by either set of stop fingers $g$ or $f$ the band $d$ will continue its movement and otherwise the action of the parts is identical with that hereinbefore described with respect to the first arrangement.

In the example given at Figs. 26 to 30, is shown a modification comprising a means of adjusting the elevation of the gripping jaws $n$ $n'$ according to the diameter of the can or the like upon the operating table or rollers $e$. For this purpose, the elevation at which the gripping jaws $n$ $n'$ work or receive the labels $y$ is or may be made capable of regulation by means of separate guides adjustable to the position in which the jaws $n$ $n'$ are required to travel, the rod $n^5$ operating the jaws having a pivotal or flexible connection in its length to allow of said adjustment.

$n^{21}$ represents bars in which are formed guide grooves $n^{21*}$ which are shaped to the path required to be traversed by the gripping jaws $n$ $n'$ and the arms $n^7$ carrying said jaws are provided at their outer ends with a cross-bar $n^{7*}$ the ends of which engage the guide grooves $n^{21*}$.

A separate pair of suitably shaped guide bars $n^{21}$ is required for each adjustment and in order that they may be readily fixed in position two rows of suitably spaced plain holes $a^{4*}$ are provided in the frame $a$ through which are passed the threaded ends of thumb screws $n^{23}$ which screw into tapped holes formed in lugs $n^{22}$ formed on the guide bars $n^{21}$.

The arms $n^7$ are provided in their length with pivotal joints $n^{7**}$ which, when the cross-bar $n^7$ is traversing the guide grooves $n^{21*}$, are coincident with the pivotal joint $n^{5**}$ of the central sliding rod $n^5$ by which means the gripping jaws $n$ $n'$ are prevented from opening during said traverse.

Figure 26:
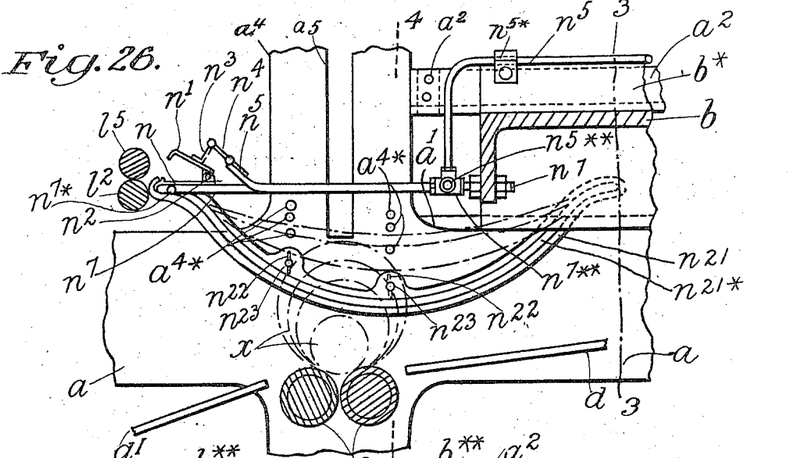
Fig. 26 is a similar view to Fig. 8 illustrating a modified means of guiding the gripping jaws.
Figure 27:
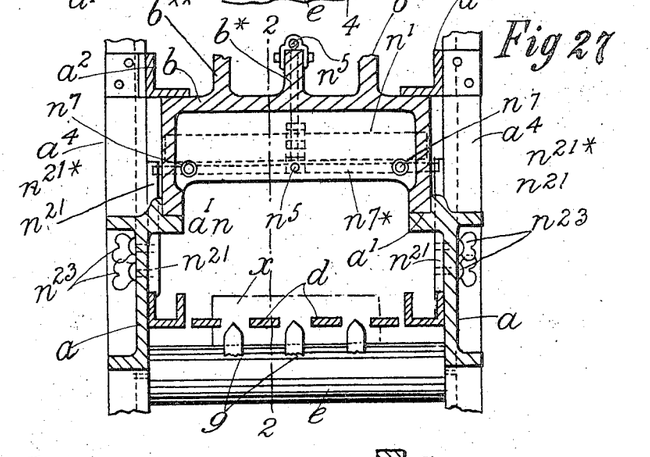
Fig. 27 is a vertical transverse section taken on the line 3—3 of Fig. 26.
Figures 28, 29, 30:
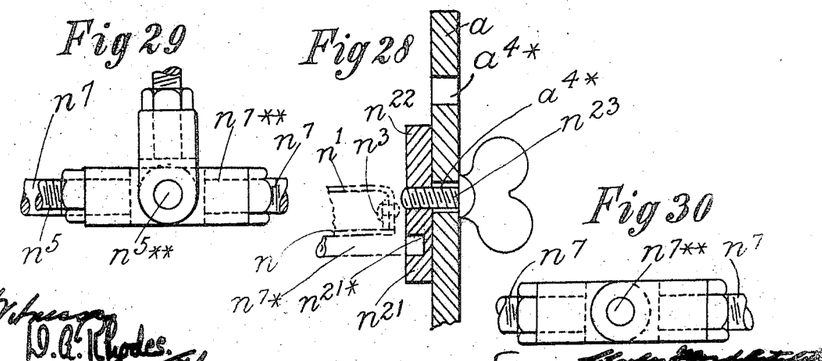
Fig. 28 is a part vertical transverse section taken on the line 4—4 of Fig. 26.
Fig. 29 is a detail view of the pivotal joints of the arms and sliding rods connected with the gripping jaws.
Fig. 30 is a detail view of the joint in the sliding rod of the gripping jaws separately.

The dotted lines $x$ in Fig. 26 indicate, by way of example, cans of different diameters, and the curved dotted lines indicate the corresponding different shapes of the guide bars $n^{21}$.

From the foregoing description it will be understood that cans, bottles or the like are arranged side by side in a row upon a slightly inclined table down which they run by gravity to the operating table, and, as the wrapping is effected, on one can or bottle, another is placed on the inclined table by hand. As the can or bottle leaves the inclined table it passes on to a pair of rollers whereon it is adapted to rest while wrapping of the label is effected.

In order to hold back the row of cans or bottles and to release one at a time so that it may take its place on the operating table, or rollers, two sets of vertical stop fingers are provided, the same being attachments of an oscillating frame or lever which is operated in such manner that one projection is above the table when the other is below. Thus the first set of projections or fingers holds the row of cans or bottles in check, and, on the depression of these fingers, the first can or bottle of the row is released and allowed to run onto the operating table, while the second set of fingers or projections is raised behind the first can or bottle so as to receive all of the others and prevent their sliding forward prematurely. The labeling having been completed on the operating table or rollers, curved projections, supported by a pivotal frame, come up under the can or bottle and give it an impulse which causes it to run off the operating table so that it is delivered from the machine. The projections giving this impulse are raised at the required times by means of the co-action of a horizontal slide, pivoted counterweighted levers, and a frame connected therewith and reciprocating in vertical guides.

The labels or wrappers are piled upon a table and are fed to cans or bottles and cement is applied thereto to the labels or wrappers. A device called a "cradle," curved substantially in the form of a semicircle, is pivoted to the vertically movable frame operated by the counter-weighted levers. The free edge or end of the said cradle is provided with a transverse bar termed a jaw, and another device is similarly provided with a transverse bar forming a fixed jaw, and these jaws co-act with a flexible band in applying a label to a can or bottle in the manner hereinbefore described. Various other devices are employed in producing the operative machine, as set forth.

What we claim is:—

1. In a machine for gumming or cementing and wrapping labels or wrappers around bottles, cans or other objects, an operating table, means for conveying the cans or the like to the operating table, means for controlling the movements of said cans, means for cement coating the labels or the like, means for carrying them to the can or the like on the operating table, a vertically movable frame arranged over the operating table, means for vertically reciprocating said frame, a cradle pivotally mounted on said frame, a fixed jaw carried by the vertically movable frame, a coacting jaw carried by the pivotal cradle, a flexible band attached at one end to the upper part of the vertically movable frame, supports for the band around which it passes, one end of the band being adjustably connected with the vertically movable frame, and means for operating said frame and cradle as described whereby a bight of the band is caused to envelop a can and the jaws carry the label around and under the can as described.

2. In a machine of the character described, the combination of an inclined table for conveying the cans or the like by gravity to the operating table, a reciprocating slide, means for reciprocating the slide and causing it to dwell at each end of its traverse, disappearing stop fingers for holding the cans or the like in check and permitting one at a time to roll on to the operating table, a disappearing stop beyond the operating table for arresting the can in correct position to be operated upon, disappearing impulse giving projections for causing the labeled can to roll off the operating table and means operated by the traverse of the slide for raising and lowering said fingers or projections and stop at the required times as set forth.

3. A machine of the character described, the combination with an inclined platform an operating table of stop fingers for controlling advance of cans or the like, a pivoted frame to which said stop fingers are attached, a spring connected with said frame for operating it, a similar frame carrying the second set of stop fingers pivotally mounted and beyond its axis provided with a cross bar acted upon by the first frame, arms carried by levers acting upon the first frame and pins upon the slide for acting upon said arms the arrangement being such that in the outward traverse of the slide the first set of stop fingers is lowered as the second set is raised the motion being effected by the slide as set forth.

4. In a machine of the character described, the combination of a main frame, a horizontal slide supported therein, a vertically movable frame and guides therefor, a cross bar on the frame working in said guides, a pair of pivotally mounted counter-balanced levers slotted to engage said cross bar, upwardly inclined guides, a cross bar carried by longitudinal bars, guides and links $g$ connecting said longitudinal bars with the counterbalanced levers, the longitudinal bars having hook shaped lower ends which engage the slide and ride on the slide when the vertically movable frame is raised to its maximum height, and a bail like link carried by the slide for engaging the hook like ends of the longitudinal bars during the outward traverse of the slide and thus lowering the counter-balanced levers and vertically movable frame as set forth.

5. In a machine of the character described, the combination with a fixed frame and a table for supporting cans and the like, of counter-balanced levers pivoted on said frame, movable devices for imparting a forward impulse to a can after labeling, a spring catch connected with such devices, and means for detachably engaging said catch with the counter-balanced levers, and a stop arranged on the frame and adapted to contact with the said catch for automatically disengaging it from the counter-balanced levers so that the can-impelling devices are automatically released and allowed to drop by gravity as described.

6. In a machine of the character described, the combination with a can-supporting table and means for wrapping a label around the cans, the same comprising a vertically movable frame, pivoted counter-balanced levers for raising and lowering such cans, a semi-circular device termed a cradle which is pivotally mounted on such vertically movable frame and provided at its free extremity with a bar acting as a jaw, another device attached to the movable frame and serving as a fixed jaw adapted to co-act with the jaw on the cradle, a flexible band arranged on transverse supports which hold it normally distended, one of such supports being adjustable, which permits the adjustment of the band to cans of different sizes, said band passing under both the coöperating jaws, an arm on the vertical movable frame and a spring connected with it so that said arm tends to turn the cradle to take up slack of the band, a stop on the frame of the machine which encounters the cradle on the rise of the vertically movable frame, thus stretching the band rod for the wrapping operation as described.

7. In a machine of the character described, the combination with a fixed frame, a vertically movable frame and fixed guides therefor, a horizontal slide arranged in the frame, counter-balanced levers pivoted in said frame, and means connecting them with the slide and movable frame, a flexible band and supports therefor holding it distended, a so called cradle pivoted on the movable frame and having a transverse bar at its free edge which serves as a jaw, means for supporting a can or like object directly below the said movable frame, and a device pendent from the movable jaw and co-acting with the cradle jaw to carry the band partly around the can and lift the latter for applying the label as described.

8. In a machine of the character described, the combination with a fixed frame having vertical guides, a movable frame adapted to slide in said guides, a horizontal slide and counter-balanced levers pivotally connected therewith and with the movable frame, a cradle pivoted to the movable frame and adapted to swing in a vertical plane, a flexible band and supports therefor, one end of the band having an adjustable support, a spring connected with the other end of the band, the cradle having a bar applied to its free end to serve as a jaw and a fixed device having a similar bar serving also as a jaw, the band passing around or outside these jaws so that they are adapted to co-act with the band in applying a label to a can as described.

CHARLES LLOYD HATCHETT.
ERNEST GEORGE RHODES.

Witnesses:
D. A. RHODES,
W. GARRETT.